No. 760,674. PATENTED MAY 24, 1904.
P. WINAND.
GAS PURIFIER.
APPLICATION FILED JAN. 14, 1902.
NO MODEL. 2 SHEETS—SHEET 1.

Witnesses:—

Inventor:—
Paul Winand
By Richards & Co
Attorneys.

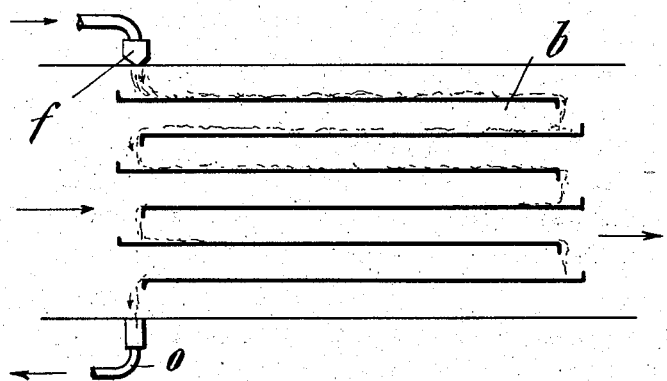
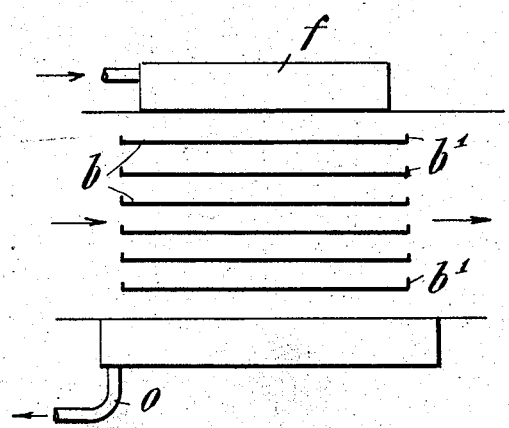
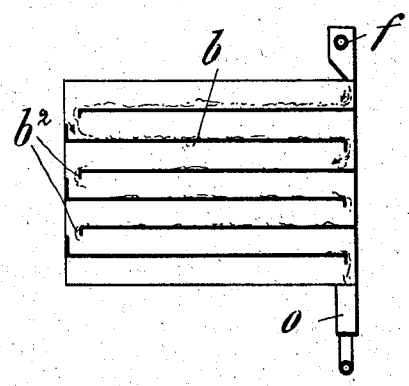
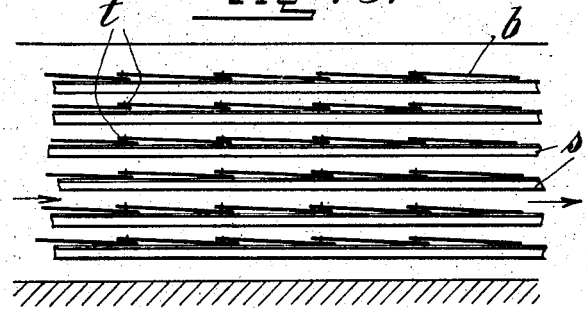
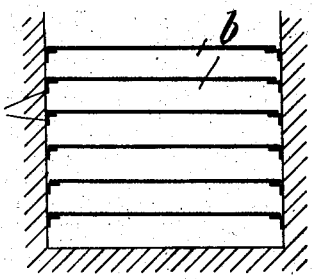

No. 760,674. Patented May 24, 1904.

UNITED STATES PATENT OFFICE.

PAUL WINAND, OF CHARKOW, RUSSIA.

GAS-PURIFIER.

SPECIFICATION forming part of Letters Patent No. 760,674, dated May 24, 1904.

Application filed January 14, 1902. Serial No. 89,752. (No model.)

*To all whom it may concern:*

Be it known that I, PAUL WINAND, a subject of the King of Belgium, and a resident of Charkow, Empire of Russia, have invented a certain new and useful Improved Purifier, of which the following is a full, clear, and exact description.

The present invention relates to that class of apparatus for removing solid or liquid constituent parts or impurities of every description from liquids, vapors, or gases by means of a series of plates over which the fluid to be treated is passed, the said plates being either dry or wetted by water or the like continually flowing over them. Hitherto these apparatuses have generally been provided with plates arranged in a substantially vertical plane and the gas has generally been caused to pass up and down between the said plates. In connection with such apparatuses the gas very often retains a great many suspended particles and the flow of the water or other purifying liquid is very fast, since it flows approximately vertically downward. Thus the contact of the fluid being treated with the water is comparatively short and the water is not effectively utilized. Now according to the present invention the flow of vapor, gas, or fluid is subdivided into a number of thin broad streams by means of a series of substantially horizontally-disposed plates which may or may not be provided with a water or other liquid flow over them. By this means the current of the liquid, gas, or vapor is slowed down, and the flow of the liquid being very slow (when such is employed) over the approximately horizontal plates the contact of the fluid being treated with the same is of much longer duration, and the said liquid is consequently more effectively utilized.

In order to render the present specification easily intelligible, reference is had to the accompanying drawings, in which similar letters of reference denote similar parts throughout the several views.

Figure 1:
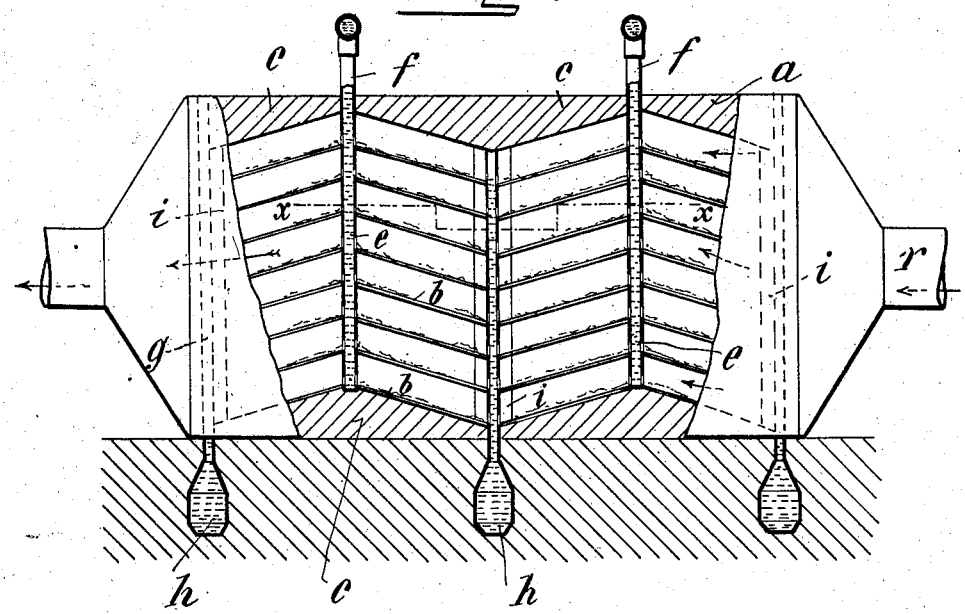
Figure 2:
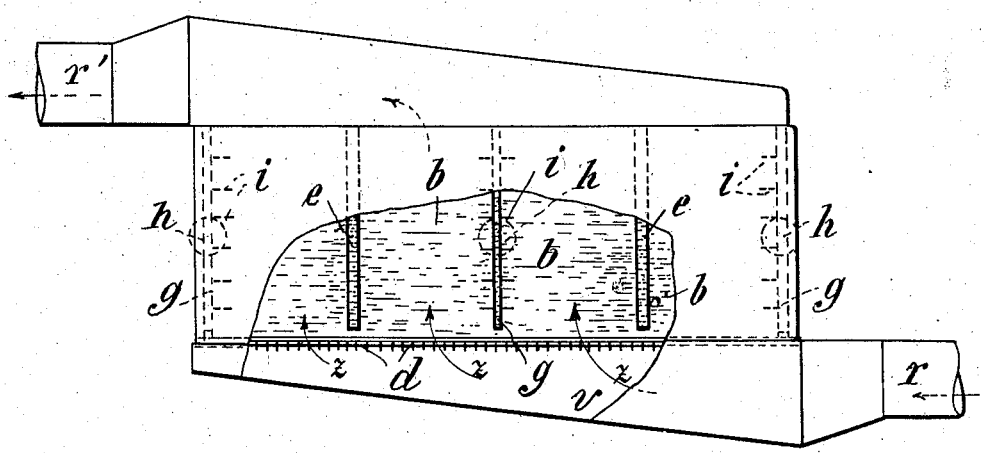

Figure 1 is a vertical section through one form of embodying the invention; Fig. 2, a plan partly in section on the line $x\ x$ of Fig. 1. Fig. 3 is a diagram showing in horizontal section another form of the invention. Figs. 4 and $4^a$ show longitudinal and cross-sectional diagrams of a further modification of the device, and Figs. 5 and $5^a$ show similar views of yet another modification.

Referring first to Figs. 1 and 2, the pipe $r$ is widened out, as at $v$, to the depth of the housing $a$ of the purifier and extends along the whole length of the said housing, so that the gas, liquid, or vapor is fed into the said housing along its whole length in the direction of the arrows $z$ in Fig. 2. The housing $a$ is subdivided approximately horizontally into a series of compartments by plates $b$, which are advantageously so disposed that they incline downward at either side of a vertically-disposed chamber $e$ to similarly-disposed chambers $g$, so that water or other liquid fed to the said chambers $e$ will flow over the plates $b$ at either side of the same and will flow off the said plates into the chambers $g$ and may be collected thence by collecting-receptacles $h$, orifices being provided in the chamber-walls to allow the outflow and inflow of the water. The spaces below the bottommost plates and above the topmost ones are advantageously filled out in some suitable manner, as indicated by cross-section lines at $c$ in Fig. 1. The outlet-pipe $r'$ is at the opposite side to the inlet, and, like the latter, it extends over the whole side of the housing $a$. In order to properly distribute the gas, vapor, or fluid being treated over all the compartments, vertically-disposed plates $d$ are provided extending along the inlet side of the housing, and a sieve or gauze may be arranged in addition to these plates, as will be readily understood. It is also advantageous in order to prevent particles or impurities from being carried through the apparatus to provide vertical baffle-plates $i$ at the outflow end of the plates, as will be seen in Fig. 1. The liquid, water or oil or other suitable liquid, is fed to the chambers $e$ through the pipes $f$, and the flow may of course be continual or interrupted, according to the requirements of the case.

In the diagram in Fig. 3 the plates $b$ are horizontally arranged and slightly displaced, each plate having one end provided with an upwardly-turned flange and the opposite end with a downwardly-turned one. The former flange of each plate extends beyond the latter, and the water or other liquid coming from the supply-pipe $f$ flows onto the top plate along the same and over the downwardly-turned flange onto the next plate below and along the length of the same, and so on until it reaches the end of the lowest plate, flowing over the downwardly-turned flange of the same out at $o$. The gas, vapor, or liquid to be purified passes through the apparatus in the direction of the arrows.

In Figs. 4 and 4ª the plates $b$ are also horizontally arranged; but the liquid is caused to flow over the same in a direction transverse to the direction of flow of the gas, vapor, or liquid to be treated. In this case the latter flows in the direction of the arrows in Fig. 4, while the plates $b$ have upwardly-turned flanges $b'$ at their sides, while one end of each plate is fixed to one wall of the apparatus and the other end is a short distance from the opposite wall and is provided with a downwardly-turned flange, as at $b^2$, each plate being fixed to the opposite wall to that below, so that the water takes a zigzag course through the plates, passing the gas or liquid to be purified at each plate.

In Figs. 5 and 5ª a series of horizontal plates are employed which overlap each other, all the plates of a series being supported on laterally-arranged angle-irons or angles of other materials, as at $s$. Each plate of a series is advantageously attached to the end of the next plate by means of a pin $t$, which extends down into a slot or orifice of the opposite end of the plate lying below it, so that the sets of superposed plates may be drawn out at the front end of the apparatus and the used-up members of the sets of composite plates may be taken off the forward end and fresh members attached to the rear ends, so that the said plates may be renewed sectionwise as they become fouled, clogged, or laden with deposits. The liquid-feed $f$ and outlet $o$ for the plates may be arranged similarly to that of Fig. 4, as will be readily understood.

I claim as my invention—

1. In a purifier the combination of a series of substantially horizontally disposed plates arranged one above the other in the path and direction of passage of the gas or liquid to be purified and adapted to subdivide the current of said gas or liquid into a series of flat shallow streams or currents without deflecting the course of the body of the fluid, means for confining the gas to pass through the spaces between the said plates and means for supplying a purifying medium to the gas between the plates, substantially as described.

2. In a purifier, the combination of a series of substantially horizontally disposed superposed plates, mounted in the path of the gas or liquid to be purified and adapted to subdivide the body of the fluid into a series of shallow streams and means for circulating a thin layer of liquid over the upper surfaces of the said plates in the manner and for the purpose substantially as described.

3. In a purifier the combination of a superposed set of plates mounted in the path of movement of the gas or liquid to be purified and means for circulating a thin sheet of liquid over the upper surfaces of said plates in a direction other than that of movement of the said gas or liquid to be purified in the manner and for the purpose substantially as described.

4. In a purifier the combination of a series of plates mounted in substantially horizontal position and superposed, means for conducting the gas or liquid to be purified to the same and causing it to pass in a series of shallow streams between the same, and means for circulating a thin sheet of liquid over the upper surfaces of the said plates in a direction opposite to that of motion of the said gas or liquid to be purified substantially as described.

5. In a purifier, the combination of a series of vertically-disposed liquid-feed chambers, a series of vertically-disposed liquid-outlet chambers, a series of substantially horizontally disposed partition-plates and means for establishing communication between the upper surfaces of the same and the said feed and outlet chambers, means for feeding the fluid to be purified to the whole side of the plates and means for carrying off the same at the whole opposite side substantially as described.

6. In a purifier the combination of a series of substantially horizontally disposed plates mounted in the path of the liquid or gas to be purified, a series of detachable members to form each entire plate and means for supporting each, thus composed, plate in a substantially horizontal position in the manner and for the purpose substantially as described.

7. In a purifier the combination of a series of substantially horizontally disposed superposed plates each consisting of a series of detachable members and all being mounted in the path of movement of the gas or liquid to be purified and means for circulating a thin sheet of liquid over the upper surfaces of the same in the manner and for the purpose substantially as described.

8. In a purifier the combination of a series of substantially horizontally disposed composite plates mounted one above the other and capable of being moved in the direction of their length, means for circulating a thin sheet of liquid over the upper surfaces of the same in a direction other than that of movement of the gas or liquid to be purified, the said plates being mounted in the path of movement of the said gas or liquid and adapted to subdivide the current of such gas or liquid into a series of shallow streams in the manner and for the purpose substantially as described.

In witness whereof I have hereunto set my hand in presence of two witnesses.

PAUL WINAND.

Witnesses:
GUSTAV HARLWIG,
WILHELM REPPICH.